United States Patent [19]

Lerch

[11] Patent Number: 4,538,797

[45] Date of Patent: Sep. 3, 1985

[54] ADJUSTABLE HYDRAULIC DIE CLAMP

[75] Inventor: Orville L. Lerch, Chicago, Ill.

[73] Assignee: CLEARING, a division of U.S. Industries, INC., Chicago, Ill.

[21] Appl. No.: 511,836

[22] Filed: Jul. 8, 1983

[51] Int. Cl.[3] .............................................. B60G 11/34

[52] U.S. Cl. ........................................ 269/27; 269/93; 269/207; 269/238

[58] Field of Search ........................ 269/27, 91, 93, 94, 269/207, 238

[56] References Cited

U.S. PATENT DOCUMENTS

| | | | |
|---|---|---|---|
| 2,803,277 | 8/1957 | Gamura | 269/93 |
| 3,336,022 | 8/1967 | Tridsell | 269/32 |

FOREIGN PATENT DOCUMENTS

| | | | |
|---|---|---|---|
| 122463 | 10/1946 | Australia | 269/32 |

*Primary Examiner*—Frederick R. Schmidt
*Assistant Examiner*—Judy J. Hartman
*Attorney, Agent, or Firm*—Emrich & Dithmar

[57] ABSTRACT

A hydraulically actuated die clamp is capable of adjustably engaging die assemblies having a wide range of thicknesses. The clamp includes a pivotally mounted clamp lever having a first end which is vertically displaced upward by use of a hydraulic piston and a second end vertically displaced downward in response thereto for securely engaging the die assembly. The second end of the lever includes a first plurality of horizontally aligned, vertically arranged notches directed downward. Coupled to the aforementioned second end of the lever by use of a spring retaining mechanism is an adjustable striker bar having a complementary arrangement of a second plurality of notches directed upward for engaging the first plurality of notches in maintaining the striker bar fixedly positioned on the second end of the lever. A die assembly is maintained in a fixed position on a die clamp base, or table, by the hydraulically actuated downward displacement of the striker bar. The first and second pluralities of notches may be disengaged from one another by overcoming the tension of the spring retaining mechanism in displacing the striker bar away from the lever along the length thereof. With the facing, complementary notches disengaged, the striker bar may then be moved vertically and repositioned either upward or downward on the second end of the lever in adjusting for the thickness of the die assembly with different, adjacent, mutually complementary notches in engagement.

13 Claims, 6 Drawing Figures

FIG. 6
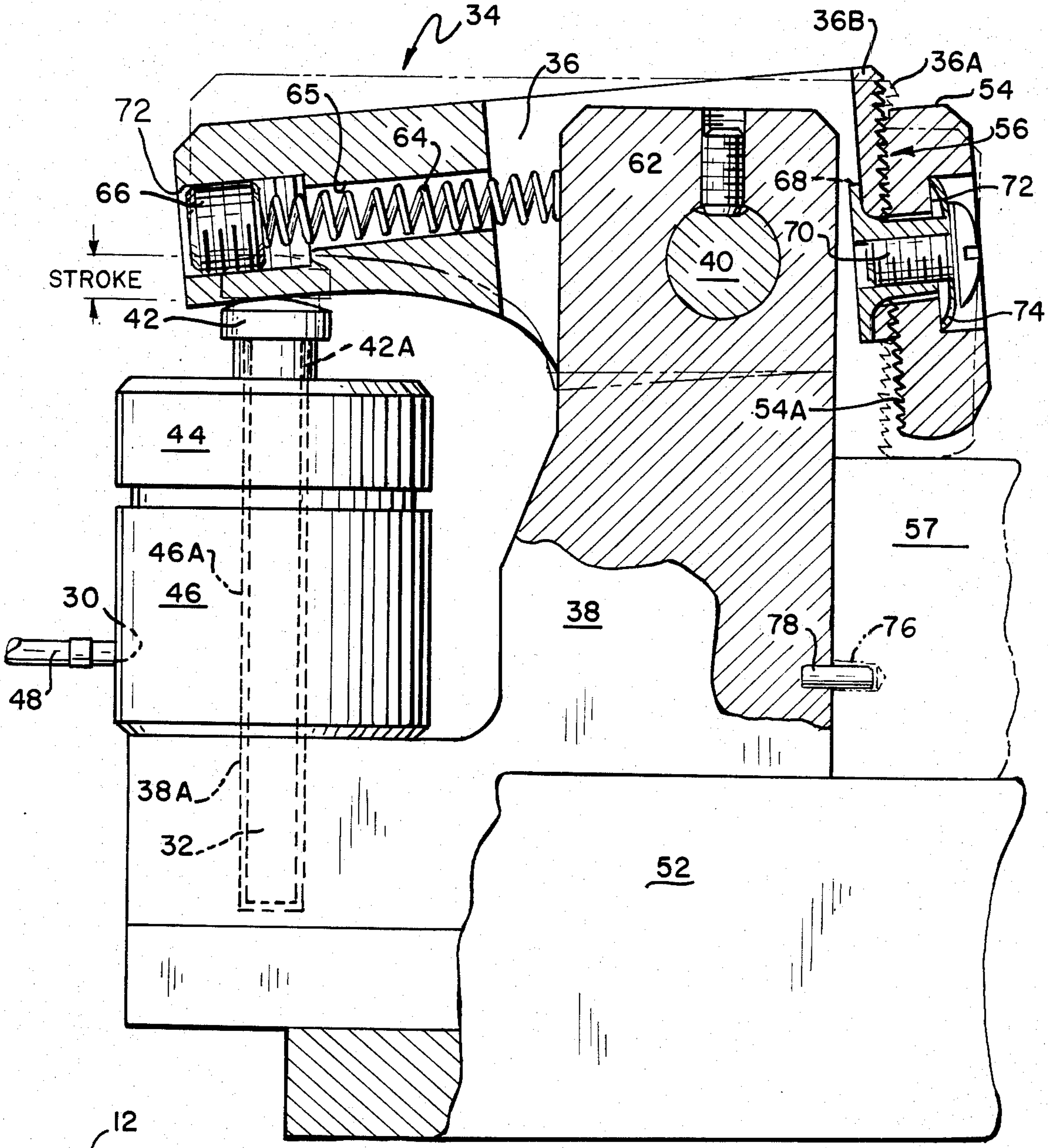
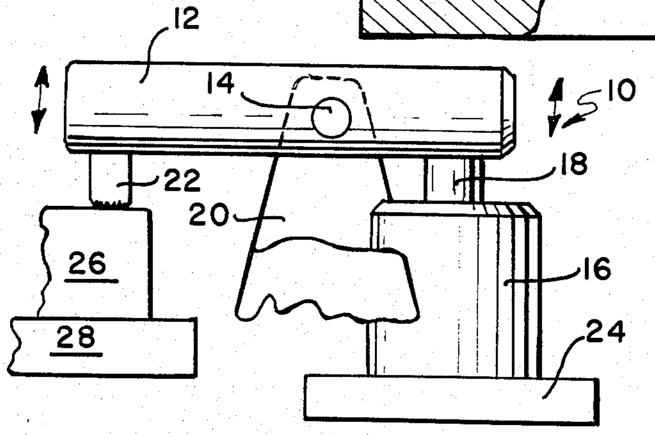
FIG. 1
(PRIOR ART)

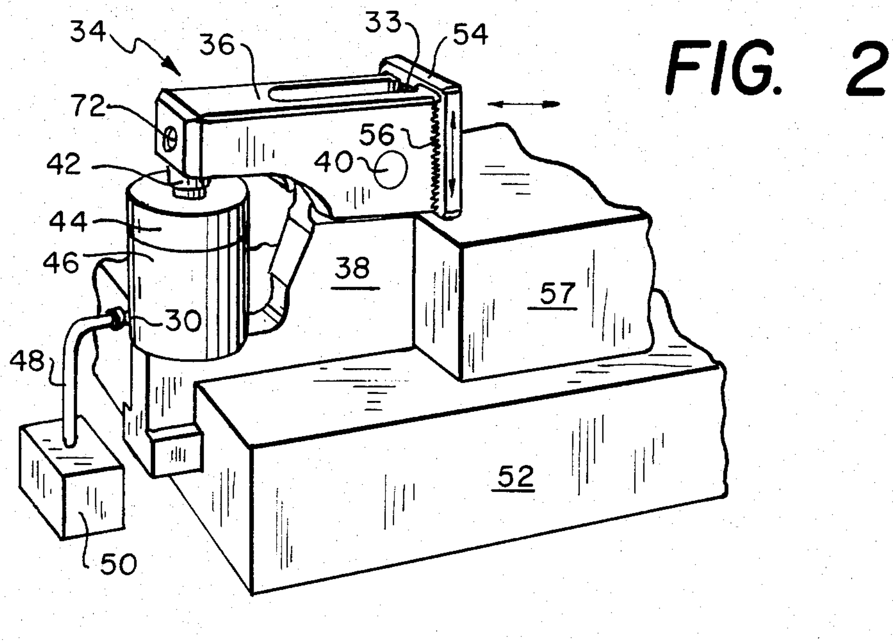
FIG. 2
FIG. 3
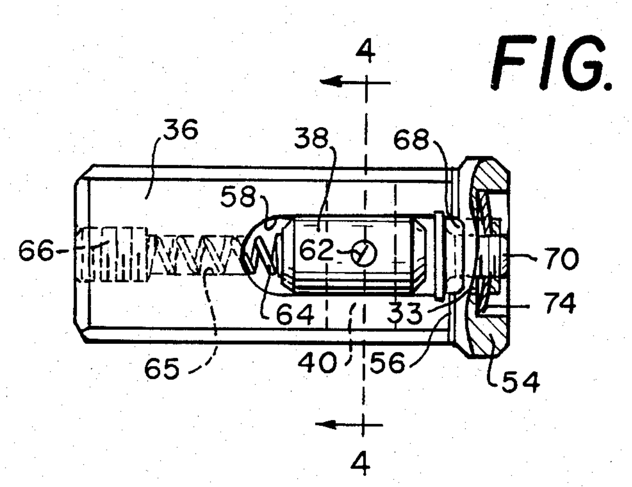
FIG. 5
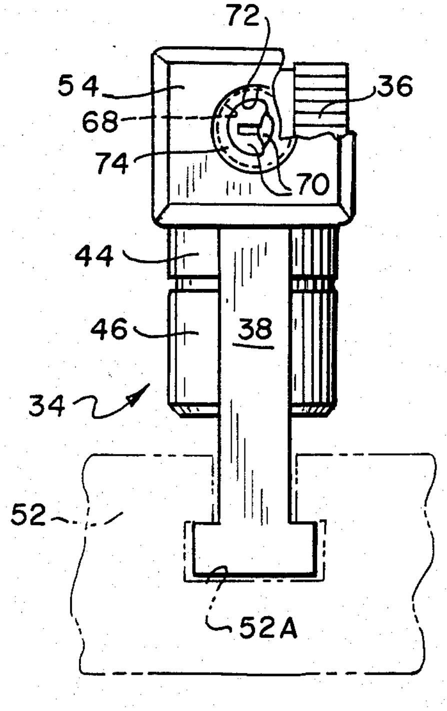
FIG. 4
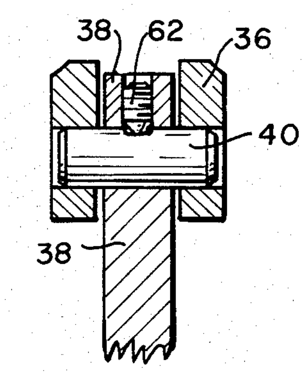

ADJUSTABLE HYDRAULIC DIE CLAMP

BACKGROUND OF THE INVENTION

This invention relates generally to die clamping means for the stationary positioning of a die assembly on a work surface and in particular is directed to an adjustable die mount for securely mounting die assemblies having a wide range of thicknesses.

A conventional die clamping assembly is shown in FIG. 1. The die clamping assembly 10 includes a die clamp body 20 which is coupled to a lever arm 12 by means of a pivot pin 14. The die clamp body 20 thus acts as a pivot support frame for the lever 12 which is free to rotate about the axis defined by the pivot pin 14. Positioned beneath the lever arm 12 on respective ends thereof is a hydraulic cylinder assembly 16 and an engaging arm, or contact, 22. The hydraulic cylinder assembly 16 is positioned upon and supported by a support base 24. The hydraulic cylinder assembly 16 is coupled to a source of hydraulic pressure (not shown) and responsive to changes in said pressure for vertically displacing the piston rod 18 of the hydraulic cylinder assembly 16. In response to the vertical displacement of the piston rod 18, lever arm 12 is rotated in either a clockwise or counterclockwise direction resulting in a corresponding displacement of the engaging contact 22 distally positioned on the lever arm 12 with respect to the piston rod 18. An upward displacement of piston rod 18 will result in the downward displacement of engaging contact 22 for securely clamping a die, or die flange, 26 to a support table 28 upon which it is positioned.

The die assembly 26 may thus be securely positioned upon the die support table 28 during the work piece forging process. Because of the large hydraulic forces typically required to securely mount a die assembly and the relatively small size of the components of the die clamp, the pivot arm 12 typically undergoes a relatively small, fixed vertical displacement. This characteristic of prior art die clamp assemblies is not a problem provided the engaging portions of the die clamp assemblies are of generally the same thickness. Problems are encountered when the clamping portions of various die assemblies vary over a wide range of thicknesses. The hydraulic die clamp 10 shown in FIG. 1 is unable to accommodate a wide range of die assembly thicknesses for the stable mounting thereof on a work surface. Heretofore, die assembly thicknesses exceeding the capabilities of a given hydraulic die clamp required replacement of that assembly with a larger unit for accommodating increased die flange thicknesses. This, of course, necessitated the use of more components with an associated increase in cost for more flexible die press operation. In addition, the changing of various press components results in an increased amount of time for tooling operations as well as an associated increase in operating expense. To date, there has not been devised an apparatus capable of clamping die assemblies having a wide range of thicknesses to a die support table without involving a complicated installation process requiring the changing of various press components.

SUMMARY OF THE INVENTION

Accordingly, it is an object of the present invention to provide an improved hydraulically actuated die mounting means capable of securely mounting die assemblies of various thicknesses to a die clamp base.

The present invention contemplates a hydraulically actuated die clamp including a lever, to a first end of which is adjustably coupled a striker bar for engaging an upper surface of a die assembly in securing the die assembly to a work surface. The lever is displaced about a pivot axis by a hydraulic piston coupled to a second end of the lever causing the downward displacement of the first end thereof to which the striker bar is mounted. Adjacent, facing surfaces of the lever and striker bar are provided with complementary interlocking teeth arrangements for their secure mutual coupling. The striker bar is maintained in position by means of a spring retainer and may be variably positioned with respect to the lever so as to engage different sets of teeth thereon. By thus selectively positioning the striker bar on the first end of the lever, die assemblies having a wide range of thicknesses may be accommodated and securely fastened to the work surface.

BRIEF DESCRIPTION OF THE DRAWINGS

The appended claims set forth those novel features believed characteristic of the invention. However, the invention itself as well as further objects and advantages thereof, will be best be understood by reference to the following detailed description of a preferred embodiment taken in conjunction with the accompanying drawings, where like reference numerals are used to designate like elements in the various views, in which:

FIG. 1 is a side elevational view of a conventional die clamp apparatus;

FIG. 2 is an upper perspective view of an adjustable hydraulic die clamp in accordance with the present invention;

FIG. 3 is a top view of the adjustable hydraulic die clamp of FIG. 2;

FIG. 4 is a sectional view taken along the sight line 4—4 as shown in FIG. 3;

FIG. 5 is a partial cutaway front elevational view of the adjustable hydraulic die clamp of FIG. 2; and FIG. 6 is a schematic side view, partly in section, showing an adjustable hydraulic die clamp in two different positions for engaging die assemblies of different thicknesses.

DESCRIPTION OF THE PREFERRED EMBODIMENT

Referring to FIG. 2, there is shown an upper perspective view of an adjustable hydraulic die clamp 34 in accordance with the present invention.

Adjustable hydraulic die clamp 34 is comprised of a die clamp body 38 securely mounted to a die clamp base 52. Inserted through an upper portion of the die clamp body 38 is a pivot pin 40 for pivotally coupling lever arm 36 to the die clamp body 38. Thus, lever arm 36 is free to rotate with respect to die clamp body 38 along the axis defined by pivot pin 40.

Positioned in contact in an abutting manner with the lower portion of one end of lever arm 36 is a piston rod 42. Piston rod 42 is coupled to and responsive to changes in fluid pressure within hydraulic cylinder 46. Hydraulic cylinder 46 includes a cap 44 through which piston rod 42 is mounted. An increase in pressure within hydraulic cylinder 46 will result in the upward displacement of the combination of the displaceable portion of the assembly and piston rod 42. This increase in fluid pressure within hydraulic cylinder 46 will, in turn, effect an upward displacement of the cylinder end portion of lever arm 36 immediately adjacent to and above hydraulic cylinder 46. Hydraulic cylinder 46 is coupled to a source of hydraulic pressure 50 at oil inlet 30 by means of a hydraulic line 48. The source of hydraulic pressure 50 may be any conventional hydraulic fluid reservoir capable of providing a variable fluid pressure to hydraulic cylinder 46.

An increase in the fluid pressure within hydraulic cylinder 46 causing an upward displacement in that end of lever arm 36 immediately adjacent thereto will result in a corresponding downward displacement of the other end, or the clamp end, of lever arm 36. Coupled to the clamp end of lever arm 36 thus displaced downward is an adjustable striker bar 54 which is adapted to engage a die set base 57. The die set base or die assembly 57 is positioned on an upper surface of the die clamp base 52 and is compressed between the die clamp base 52 and the thus downwardly displaced adjustable striker bar 54 and is maintained in stable position therebetween. Element 57 represents that portion of a die set base, which may include a mounting flange, used to securely position the die assembly upon the die clamp base 52. The manner in which the adjustable striker bar 54 is adjustably positioned upon lever arm 36 is described in detail below.

Referring to FIGS. 3 and 4, there are respectively shown a top plan view partially in schematic form and a sectional view taken along sight line 4—4 as shown in FIG. 3 of the lever arm 36 pivotally mounted to an upper portion of the die clamp body 38. The clamp end portion of the lever arm 36 includes a U-shaped aperture in which the upper part of the die clamp body 38 is inserted. With the die clamp body 38 thus positioned within aperture 58 of lever arm 36, pivot pin 40 is inserted in the aligned apertures of lever arm 36 and die clamp body 38 for pivotally coupling lever arm 36 and die clamp body 38. The upper surface of die clamp body 38 includes a tap hole therein into which a set screw 62 is positioned for maintaining pivot pin 40 within lever arm 36 and a die clamp body 38.

Adjustable striker bar 54 is mounted on one end of lever arm 36 by means of the combination of a retainer clip 68, curved spring washer 74 and mounting screw 70 (not shown). The other end of lever arm 36 is provided with a longitudinal aperture, or channel, 65 therein in which is inserted a linearly compressible spring 64. One end of spring 64 is aligned with and abuts a forward portion of the upper part of die clamp body 38. The other end of spring 64 abuts and is maintained in position by means of a counter sunk pipe plug 66 threadably inserted in an outer portion of channel 65. Thus, spring 64 is maintained in a compressed state for maintaining the open position of lever arm 36 for assembly clearance between the adjustable striker bar 54 and the die set base or die assembly 57. Maintaining the longitudinal axis of lever arm 36 and hydraulic cylinder 46 in this relative orientation aids in assembly to the die set base 57 and its more secure and stable positioning upon die clamp base 52.

Referring to FIG. 5, there is shown a partially cutaway front elevational view of the adjustable hydraulic die clamp 34 of the present invention. As shown in FIG. 5, the cross section of a lower portion of die clamp body 38 is in the general form of an inverted "T". The die clamp base 52 is provided with a complementary T-shaped channel 52A in which the lower portion of die clamp body 38 is slidably inserted. This complementary T-shaped mounting arrangement provides for the stable and secure positioning of the die clamp body 38 within the die clamp base 52 and allows for the die clamp body 38 to be moved laterally along die clamp base 52.

The adjustable striker bar 54 includes a recessed portion 72 forming an aperture therein. Inserted in aperture 72 is the combination of retainer clip 68 and mounting pin 70. Retainer clip 68 is adapted to engage an end portion of lever arm 36 and is threadably coupled to mounting pin 70. Mounting pin 70 is adapted to engage the recessed portion 72 of adjustable striker bar 54 by means of curved spring washer 74 for securely mounting the adjustable striker bar 54 to the clamp end portion of lever arm 36. Positioned between mounting pin 70 and the recessed portion 72 of adjustable striker bar 54 is the curved spring washer 74 for retaining the respective, facing surfaces of lever arm 36 and adjustable striker bar 54 in secure engagement. Curved spring washer 74, in addition, permits adjustable striker bar 54 to be continually displaced outward and away from lever arm 36 in allowing for the adjustable positioning of adjustable striker bar 54 on the forward end portion of lever arm 36. The details of the adjustable features of the hydraulic die clamp of the present invention is described in the following paragraphs.

Referring specifically to FIG. 6, there is shown a schematic side view, partly in section, showing an adjustable hydraulic die clamp 34 in accordance with the present invention and the manner in which a die assembly is engaged and securely mounted by means of the adjustable hydraulic die clamp. As shown in FIG. 6, the lower, rear portion of die clamp body 38 is provided with a channel 38A therein. Similarly, hydraulic cylinder 46 and piston rod 42 are provided with respective channels 46A, 42A therein. The respective channels of die clamp body 38 and hydraulic cylinder 46 and piston rod 42, are linearly aligned with respect to one another and a headed cylinder pin 32 is inserted therein. Cylinder pin 32 provides for the stable positioning of hydraulic cylinder 46 and piston rod 42 on die clamp body 38 and insures that the hydraulic force exerted by hydraulic piston rod 42 is directed 90° to the surface portion of the die clamp body 38 upon which the hydraulic cylinder 46 is positioned. For pressurizing piston oil inlet 30 is located in the hydraulic cylinder body which can rotate about cylinder pin 32. Spring 64 positioned between an aft surface of die clamp body 38 and counter sunk pipe plug 66 inserted in lever arm 36 exerts a torque upon lever arm 36. The torque thus applied by spring 64 to lever arm 36 causes the lever arm to rotate in a counterclockwise direction as viewed in FIG. 6. The counterclockwise rotation of lever arm 36 thus insures that an aft, lower surface of lever arm 36 is maintained in contact with an upper portion of piston rod 42 regardless of the degree of extension of piston rod 42 from hydraulic cylinder 46. In a preferred embodiment, die clamp body 38 is provided with a stop pin 78 and die set base 57 is provided with a complementary alignment aperture 76. By positioning pin 78 within alignment aperture 76, die set base 57 is prevented from sliding when the die clamp base 52 is inclined in a position perpendicular to the clamp with no pressure in the hydraulic cylinder 46.

Referring to the upper right hand portion of FIG. 6, the manner in which the hydraulic die clamp of the present invention may be selectively adjusted for accommodating die assemblies of various thicknesses will now be described. The forward surface of lever arm 36 is provided with a first set of serrations or notches 36A. Similarly, the immediately adjacent, facing surface of adjustable striker bar 54 is provided with a second set of teeth-like serrations 54A. As shown in the Figure, the first and second sets of serrations 36A, 54A are in the form of a plurality of horizontally aligned, vertically arranged, sharp-edged notches in a complementary orientation. Thus, the first set of serrations 36A is oriented in a downward direction, while the second set of serrations 54A is oriented in a generally upward direction. Thus, the first and second sets of serrations 36A, 54A form mutually engaging surfaces for the secure and stable positioning of the adjustable striker bar 54 on the adjacent clamp end of lever arm 36. Lever arm 36 and adjustable striker bar 54 are coupled by means of mounting pin 70 inserted in a retainer clip 68 in combination with curved spring washer 74. Adjustable striker bar 54 may be displaced relative to lever arm 36 and adjustably positioned thereon by displacing the adjustable striker bar 54 in a direction away from lever arm 36 in overcoming the tension of spring washer 74. With adjustable striker bar 54 thus displaced outward from lever arm 36 and the facing first and second sets of serrations 36A, 54A thus disengaged, the combination of retaining clip 68 and mounting pin 70 may be displaced along a generally vertically oriented slot 33 in the forward, or clamp end, portion 36B of lever arm 36. Thus, the adjustable striker bar 54 may be vertically displaced relative to the forward portion 36B of lever arm 36 for the selective engagement of desired combinations of mutually facing first and second sets of serrations 36A, 54A in vertically positioning adjustable striker bar 54 relative to lever arm 36. By selectively positioning the adjustable striker bar 54 on the end of lever arm 36, the distance between the lower surface of adjustable striker bar 54 and the upper surface of die clamp base 52 may be established as desired to accommodate a given thickness of the die set base 57. By moving adjustable striker bar 54 upward along the forward surface of lever arm 36, a die set base 57 of increased thickness may be securely mounted to die clamp base 52. Similarly, by fixedly positioning adjustable striker bar 54 on a lower portion of the front surface of lever arm 36, a thinner die configuration may be securely mounted to die clamp base 52. This configuration is shown in dotted line form in FIG. 6.

From the various figures, it can be seen that the distance from the cylinder end of lever arm 36 to pivot pin 40 is greater than the distance from the clamp end of lever arm 36 to pivot pin 40. Thus, the stroke at the cylinder end of lever arm 36 is greater than that at its clamp end. By thus placing the adjustable engagement means at the end of lever arm 36 having the shorter rather than the longer stroke, a greater range of die assembly thicknesses may be accommodated for secure and stable mounting.

There has thus been shown an adjustable hydraulic die clamp arrangement which is capable of securely mounting die fixtures having a wide range of thicknesses to a work surface. This capability is made available in the present invention by means of a single manual adjustment to the die clamp structure.

While particular embodiments of the present invention have been shown and described, it will be obvious to those skilled in the art that changes and modifications may be made without departing from the invention in its broader aspects. For example, hydraulic cylinder 46 is shown mounted upon die clamp body 38 which can then be displaced along the die clamp base 52. However, the present invention also envisions mounting the hydraulic cylinder directly to the die clamp base, or any work surface, where the aforementioned displacement, or adjustment, capability is not desired. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A hydraulic clamp mounted to a work surface and coupled to a source of hydraulic pressure for securely attaching a die assembly to said work surface, said clamp comprising:

a body securely mounted to said work surface;

a lever having first and second end portions and an intermediate portion pivotally coupled to said body;

hydraulic displacement means coupled to said source of hydraulic pressure and responsive to changes in pressure and further coupled to the first end portion of said lever for displacing said first end portion in response to changes in said pressure;

engaging means for engaging and securely mounting a die assembly positioned on said work surface;

coupling means for mounting said engaging means in position upon the second end portion of said lever; and resilient means cooperating with said coupling means for urging said engaging means towards and in secure engagement with the second end portion of said lever, wherein said resilient means is adapted for displacement away from the second end portion of said lever to allow for disengagement of said engaging means from said lever whereby the displacement between said engaging means and said work surface may be selectively varied to accommodate a range of thicknesses of said die assembly by changing the position of said engaging means on the second end portion of said lever while maintaining secure coupling between said engaging means and said lever.

2. A clamp as in claim 1 wherein the second end portion of said lever and said engaging means include respective first and second facing surfaces, said first and second facing surfaces each including respective first and second pluralities of parallel serrations for the mutual engagement thereof in securely mounting said engaging means on the second end portion of said lever.

3. A clamp as in claim 2 wherein said first and second pluralities of parallel serrations are arranged in respective parallel arrays perpendicular to said work surface.

4. A clamp as in claim 3 wherein said first and second pluralities of parallel serrations include respective engaging surfaces thereof with the engaging surfaces of the first plurality of parallel serrations oriented in a direction opposite to a direction of orientation of the engaging surfaces of the second plurality of parallel serrations in a complementary manner.

5. A clamp as in claim 4 wherein the engaging surfaces of said first plurality of parallel serrations are directed away from said work surface while said second plurality of parallel serrations are directed toward said work surface.

6. A clamp as in claim 1 wherein said resilient means includes a curved spring washer in contact with said engaging means and said coupling means includes a connecting pin inserted through said curved spring washer and said engaging means and securely coupled to said lever.

7. A clamp as in claim 1 wherein the distance from the intermediate pivotal portion to the first end portion of the lever is greater than the distance from the intermediate pivotal portion to the second end portion of the lever.

8. A clamp as in claim 1 wherein said hydraulic displacement means includes a hydraulic piston and rod combination for displacing the first end portion of said lever in response to changes in hydraulic pressure.

9. A clamp as in claim 1 wherein said clamp body is moveably mounted to said work surface and said hydraulic displacement means is mounted on said clamp body.

10. A clamp as in claim 9 wherein said hydraulic displacement means and said clamp body include respective first and second channels in alignment and said clamp further includes a mounting pin inserted in said first and second channels for maintaining said die assembly in a fixed position when inclined.

11. A clamp as in claim 1 wherein said clamp body includes an alignment pin extending therefrom for engaging said die assembly in ensuring its proper positioning with respect to said clamp body.

12. In a hydraulic clamp for securely mounting a die assembly to a work surface, said hydraulic clamp coupled to a source of hydraulic pressure and responsive to variations therein and including an end portion displaceable in response to variations in said hydraulic pressure for securely engaging said die assembly on said work surface, the improvement comprising:

engaging means for securely engaging a die assembly positioned on the work surface;

coupling means for mounting said engaging means in position upon the end portion of said hydraulic clamp; and resilient means positioned on the end portion of said hydraulic clamp and cooperating with said coupling means for urging said engaging means in secure, fixed engagement with the end portion of said hydraulic clamp, wherein said resilient means is adapted for displacement away from the end portion of said hydraulic clamp in releasing said engaging means from fixed engagement therewith in permitting the position of said engaging means upon the end portion of the hydraulic clamp to be selectively varied for securely mounting die assemblies having a range of thicknesses to the work surface.

13. A die clamp as in claim 9 wherein the work surface includes an elongated, linear slot therein and a lower portion of said clamp body includes a generally T-shaped base adapted for insertion within said linear slot in tight fitting relation and displacement along said slot.

* * * * *